June 22, 1954  G. C. JACOBSEN  2,681,539
CUTTER ATTACHMENT FOR TRACTORS
Filed July 14, 1952  2 Sheets-Sheet 1
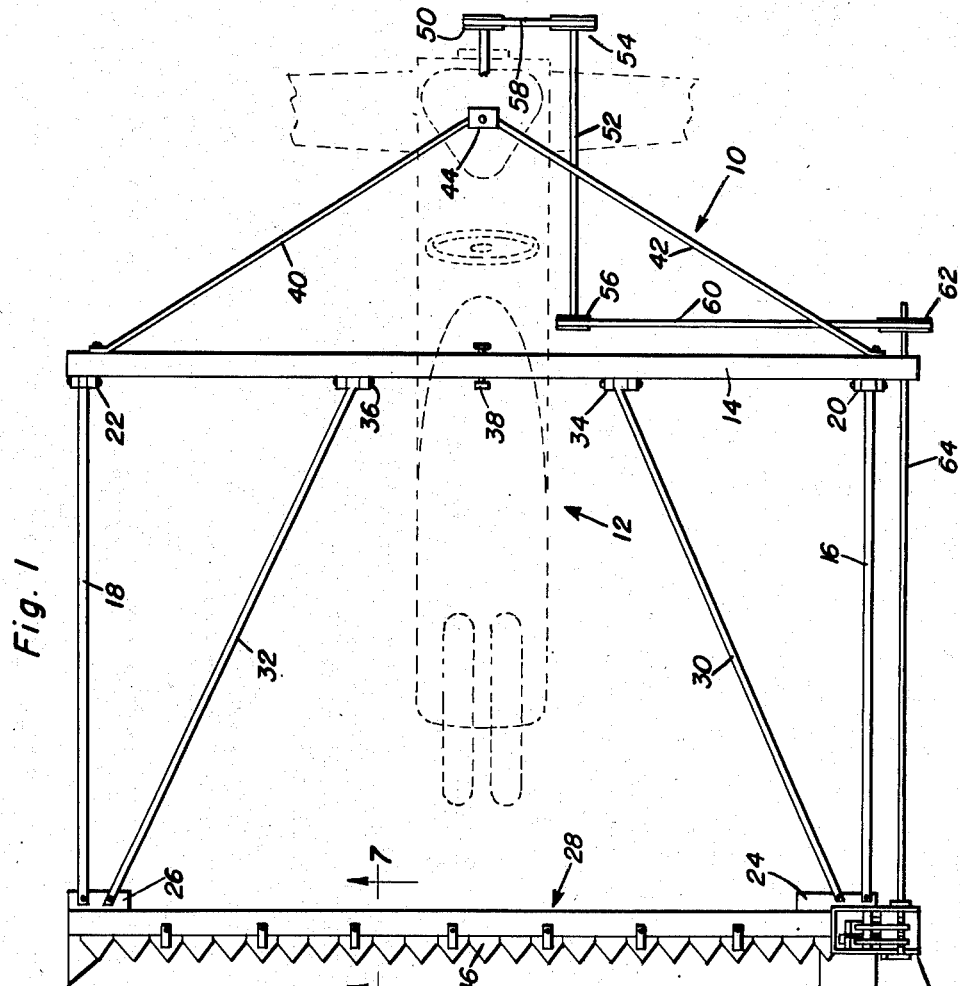
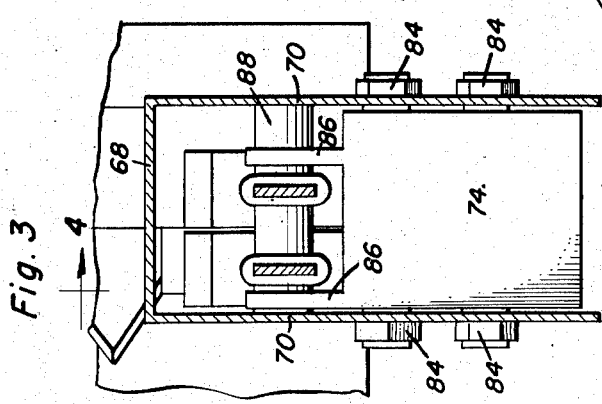
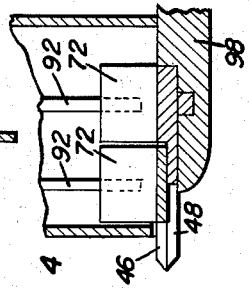
George C. Jacobsen
INVENTOR.

June 22, 1954  G. C. JACOBSEN  2,681,539
CUTTER ATTACHMENT FOR TRACTORS
Filed July 14, 1952  2 Sheets-Sheet 2

George C. Jacobsen
INVENTOR.

BY *Thomas A. O'Brien*
*and Harvey B. Jacobson*
Attorneys

Patented June 22, 1954

2,681,539

UNITED STATES PATENT OFFICE 2,681,539

CUTTER ATTACHMENT FOR TRACTORS

George C. Jacobsen, Nampa, Idaho

Application July 14, 1952, Serial No. 298,818

2 Claims. (Cl. 56—25)

The present invention relates to an improved mower attachment for tractors that may be quickly and easily mounted on a tractor and that may be attached to conventional tractors without necessitating structural modifications of the tractor.

It is an important object of the invention to provide a mower attachment frame that is light in weight, inexpensive of manufacture and of greatly simplified construction over frames heretofore used while yet being of extremely sturdy construction.

It is another important object of the invention to provide a mower attachment having a novel drive means for reciprocating a sickle bar from the power take-off shaft of a tractor.

Another object of the invention, ancillary to the preceding object, is the provision of a novel driving connection from the drive means of the mower attachment to the sickle bar whereby the sickle bar may be easily and quickly disconnected from the drive means and removed from the frame for sharpening, replacement or repair.

A still further object of the invention is the provision of a mower attachment for tractors utilizing narrow shoes at the ends of the cutter bar assembly whereby the effective cutting width of the mower attachment extends substantially the entire width of the attachment so that the operator of the attachment may cut from either side of the tractor.

These, together with various ancillary objects and features which will become apparent as the following description proceeds, are attained by the present invention, a preferred embodiment of which is illustrated by way of example only in the accompanying drawings, wherein:

Figure 1 is a top view of the mower attachment mounted on a tractor with the tractor being shown in outline form;

Figure 3 is an enlarged sectional top view of the driving connection of the reciprocable sickle bar taken substantially along section line 3—3 of Figure 2;

Figure 6 is a side view in section of the driving connection of the reciprocable sickle bars taken along section line 6—6 of Figure 4.

It will be noted that throughout the specification and the various views of the drawings like reference numerals are utilized to designate like parts.

Figure 2:
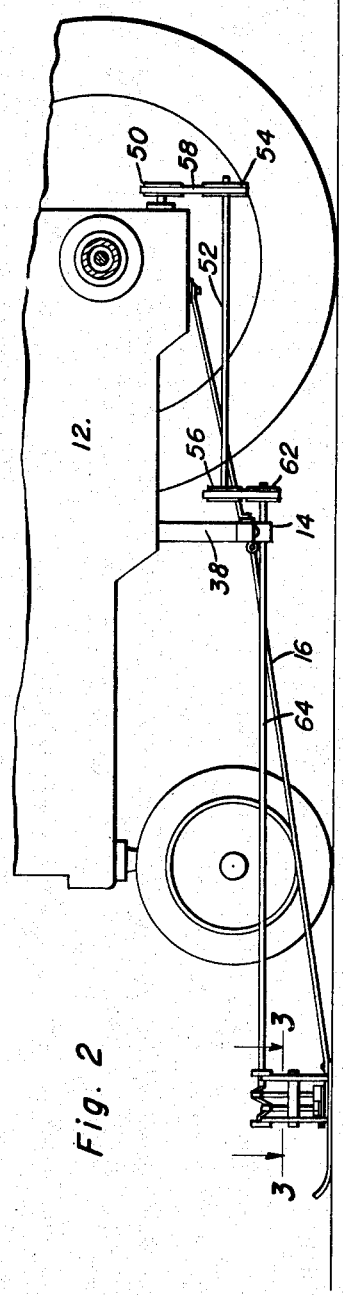
Figure 2 is a side view of the mower attachment mounted on a tractor.

Referring now to the accompanying drawings in detail, attention is first directed to Figure 1 wherein the mower attachment which forms the subject matter of the present invention is shown in its attached position to a tractor.

The mower attachment comprises a frame 10 mounted on a tractor 12, shown in outline form on Figure 1. The frame 10 comprises an elongated beam 14 having a pair of side frame members 16 and 18 secured to the ends thereof as by hinged connections 20 and 22 respectively. It will be noted that hinged connection 20 is spaced inwardly from the end of the beam 14 for a purpose that will be presently apparent. Shoes 24 and 26 are secured to the free ends of frame members 16 and 18 and a cutter bar assembly 28 is mounted at its ends on the shoes. As is apparent from an examination of Figure 1, the cutter bar assembly 28, parallel side frame members 16 and 18 and the elongated beam 14 comprise a rectangular mower attachment frame. To further secure the cutter bar assembly 28 to the elongated beam 14, diagonal braces 30 and 32 are attached to the shoes 24 and 26 respectively, and converge rearwardly toward one another to their hinged connections 34 and 36 at spaced, intermediate points along beam 14.

Beam 14 is suspended from its central portion from the tractor 12 by means of the yoke 38 secured to the underside of the tractor. Extending rearwardly from the ends of the beam 14 and converging toward one another are a pair of braces 40 and 42 having attaching plates 44 at the free ends thereof for attachment to the rear portion of a tractor in order to more firmly mount and balance the beam 14 on the tractor.

From this construction, it is apparent that the beam 14 will be securely mounted on the tractor while yet requiring no modification of the tractor structure. Further, by the simple hinged connections 20, 22, 34 and 36, the cutter bar assembly 28 is permitted to follow the contour of the surface to be moved or cut as well as permitting the cutter bar assembly 28 to be raised out of ground engaging position when the tractor to which the mower attachment is attached is to be moved from place to place.

Figure 7:
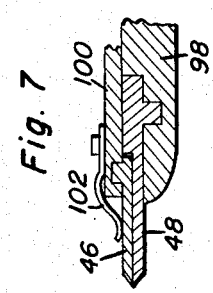
Figure 7 is an enlarged sectional view of the sickle bar mounting of the cutter bar assembly taken along section line 7—7 of Figure 1.

Mounted on the cutter bar assembly 28 and forming a part thereof are reciprocable cutter bars 46 and 48 (note Figures 6 and 7). Driving means for reciprocating these cutter bars are attached to the frame 10 of the mower attachment and are further adapted to be connected to a source of power, preferably the power take-off of a tractor such as power take-off 50. A lay shaft 52, having pulleys or sprockets 54 and 56 at the ends thereof is adapted to be disposed alongside the tractor frame rearwardly of the beam 14. Cable or chain means 58 interconnect the power take-off with the pulley or sprocket 54 causing the lay shaft 52 to rotate. Belt 60 interconnects the other end of the lay shaft 52 by way of pulley 56 to pulley 62 mounted on the crankshaft 64 which is in turn drivingly connected to reciprocable cutter bars 46 and 48. It is to be noted that crankshaft 64 is journaled through the end of beam 14 adjacent hinged connection 20 of the side frame member 16 and it is to accommodate this connection that hinged connection 20 is spaced inwardly from this end of the beam 14. As shown, crankshaft 64 extends parallel to frame members 16 and 18 and is disposed adjacent frame member 16.

Mounted on the shoe 24 is a U-shaped shield or housing 66 having a web 68 extending transversely of the longitudinal axis of the cutter bar assembly 28 and having legs 70 opening at the end of the cutter bar assembly. The end of crankshaft 64 is supported on and rotatably journaled on the legs 70 of the shield 66. Mounted on each of the reciprocable cutter bars 46 and 48 and disposed within the confines of the shield 66 is a block 72 (note Figure 6).

Figure 5:
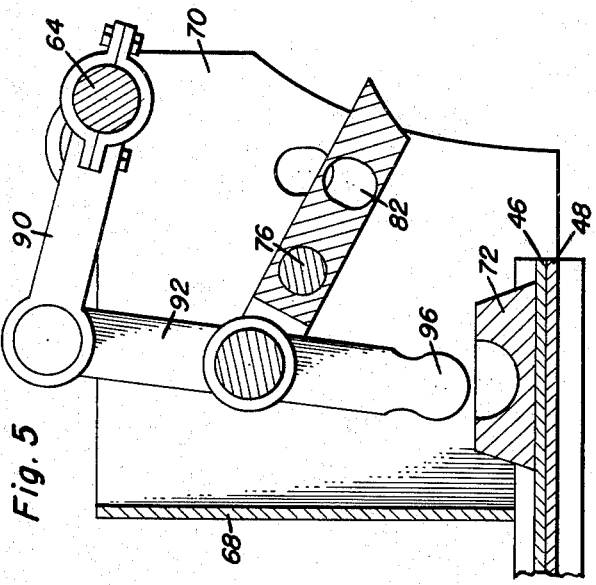
Figure 5 is a view similar to Figure 4 showing the driving means disconnected from the reciprocable sickle bar.
Figure 4:
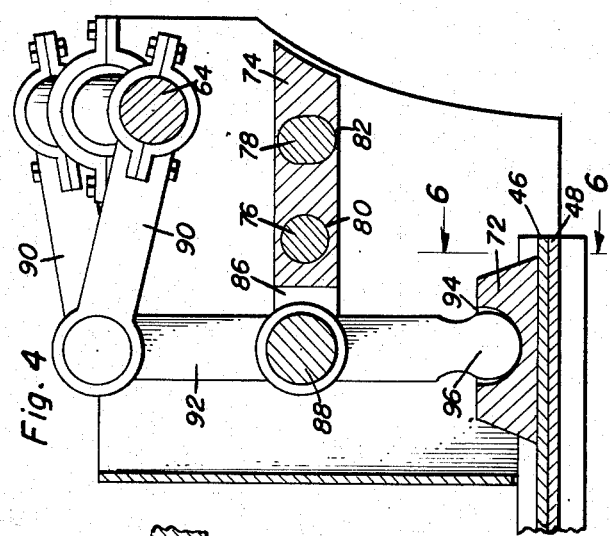
Figure 4 is a sectional view of the driving connection of the reciprocable sickle bars forming a part of the cutter bar assembly taken substantially along section line 4—4 of Figure 3.

Referring next to Figures 3, 4 and 5, the driving connection between the crankshaft and the reciprocable cutter bars 46 and 48 may be clearly observed. Mounted between the legs 70 of the shield 66 is a horizontally disposed bar or plate 74 secured by bolts 76 and 78 extending through bores 80 and 82 of the bar respectively. It will be noted that the bore 80 and the bolt 76 are both circular while the bore 82 and the bolt 78 are both oval shaped for a purpose that will become immediately apparent. Nuts 84 disposed against the outer surfaces of legs 70 secure the bolts in place. Extending from the inner end of the bar 74 are spaced lugs 86 between which shaft 88 is rotatably journaled. Extending from the portion of the crankshaft between the legs 70 of the shield 66 are a pair of crank arms 90 and depending from the ends of these crank arms are a pair of connecting or rocker arms 92 which are pivoted intermediate their ends to shaft 88. On the upper surface of each block 72 mounted on reciprocable cutter bars 46 and 48 is a concave recess 94. The lower end 96 of the rocker arm 92 is rounded and seats in a recess 94 of a block 72. By this arrangement, upon rotation of the crankshaft, the rocker arm 92 is rocked about bar 74 by virtue of the shaft 88 whereby the blocks 72 and consequently the cutter bars 46 and 48 are reciprocated in the cutter bar assembly. It is to be noted that although the embodiment illustrated in the drawings discloses a pair of reciprocable cutter bars, this driving connection could be utilized equally efficiently with only one reciprocable cutter bar and a stationary cutter bar.

To remove the rocker arms 92 from the driving connection with the blocks 72, it is only necessary to remove the bolt or pin 78 from the bar 74 and the legs 70 of the shield 66 thereby permitting the bar 74 to pivot about bolt 76 and raising the lower end 96 of the rocker arm 92 out of engagement with the block 72. By this arrangement, an extremely simple and expeditious means for removing the reciprocable cutter bars for any desired purpose results.

Further, aside from its function of supporting the end of the crankshaft 64, the shield 66 serves to protect the driving connection between the crankshaft 64 and the reciprocable cutter bars 46 and 48 from damage due to grit lodging therein from the hay or other material being mowed as well as protecting this connection from damage due to obstructions the mowing attachment is likely to encounter.

Although the mounting of the reciprocable cutter bars is in itself conventional, this mounting is clearly shown in Figure 7 of the drawing wherein the lower cutter bar 48 is mounted in a guide or finger bar 98 for guiding sliding movement therein, reciprocable bar 46 abuts the bar 48 and is retained for reciprocably guided movement by the hinge plate 100 mounted on the top of finger bar 98 and the resilient clips 102 depending from the edge of plate 100 help maintain the bar 46 in abutting engagement with the bar 48. To additionally protect the driving connection of the crankshaft with the reciprocable bars 46 and 48, skid plate 104 is secured to shoe 24.

From the above description, the construction and operation of the mower attachment of the present invention are believed to be readily apparent. However, since numerous modifications and changes will readily occur to those skilled in the art after a perusal of the foregoing specification and the accompanying drawings, it is not desired to limit the invention to the exact construction shown and described, but, all suitable modifications may be resorted to falling within the scope of the appended claims.

Having described the invention, what is claimed as new is:

1. A mower attachment for tractors comprising a frame including spaced side frame members having ends, a cutter bar having ends and being connected at its ends to the ends of said side frame members, a sickle bar reciprocably mounted on said cutter bar, said sickle bar having spaced apart ends, an upstanding block having a recess therein secured to one end of said sickle bar, an upstanding casing on said frame partially surrounding said block, a crankshaft mounted on said frame and terminating above said block, said crankshaft being rotatably journaled in said casing, means operatively connecting said crankshaft and said block and means operatively engaging said crankshaft for drivingly connecting the crankshaft to a source of power, said operatively connecting means comprising a rocker arm removably seated at one end in said recess, a crank arm extending from said crankshaft, the other end of said rocker arm being connected to said crank arm and means pivoting said rocker arm to said casing intermediate its ends.

2. A mower attachment for tractors comprising a frame including spaced side frame members having ends, a cutter bar having ends and being connected at its ends to the ends of said side frame members, a sickle bar reciprocably mounted on said cutter bar, said sickle bar having spaced apart ends, an upstanding block having a recess therein secured to one end of said sickle bar, an upstanding casing on said frame partially surrounding said block, a crankshaft mounted on said frame and terminating above said block, said crankshaft being rotatably journaled in said casing, means operatively connecting said crankshaft and said block and means operatively connected to said crankshaft for drivingly connecting the crankshaft to a source of power, said operatively connecting means comprising a rocker arm removably seated at one end in said recess, a crank arm extending from said crankshaft, the other end of said rocker arm being connected to said crank arm and means pivoting said rocker arm to said casing intermediate its ends, said last named means comprising a plate pivotally secured within said housing and releasable means for locking said plate against pivotal movement.

References Cited in the file of this patent

UNITED STATES PATENTS

| Number | Name | Date |
|---|---|---|
| 1,084,134 | Cranlund | Jan. 13, 1914 |
| 1,335,266 | Zander | Mar. 30, 1920 |
| 1,610,498 | Duckett | Dec. 14, 1926 |
| 2,251,637 | Ronning | Aug. 5, 1941 |
| 2,264,118 | Krenzke | Nov. 25, 1941 |
| 2,270,646 | Campbell | Jan. 20, 1942 |
| 2,340,488 | Paradise et al. | Feb. 1, 1944 |
| 2,374,533 | Fulton | Apr. 24, 1945 |
| 2,485,383 | Hoyt | Oct. 18, 1949 |
| 2,513,703 | Annis | July 4, 1950 |